Sept. 10, 1935.  F. H. SCHLESSER  2,014,265
METAL SPRING COVER
Filed Jan. 3, 1933
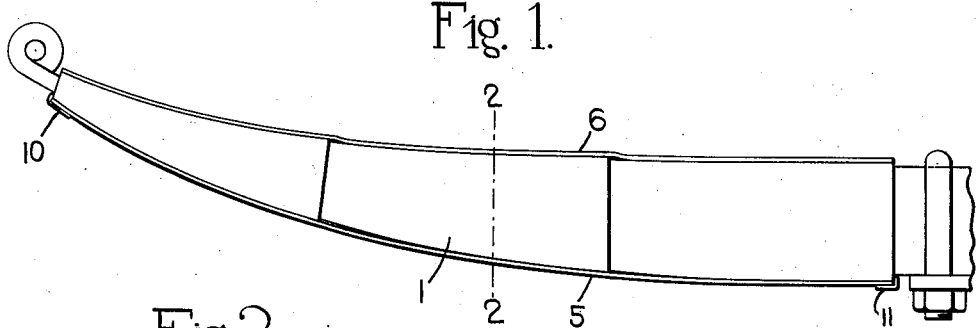
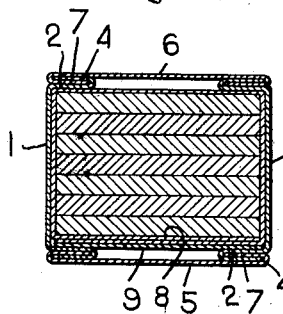
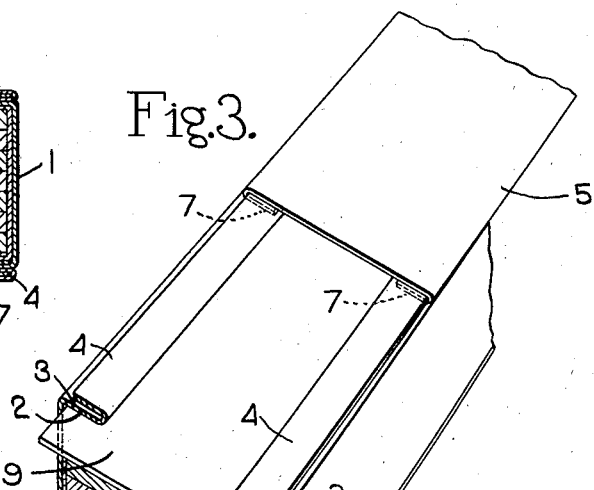
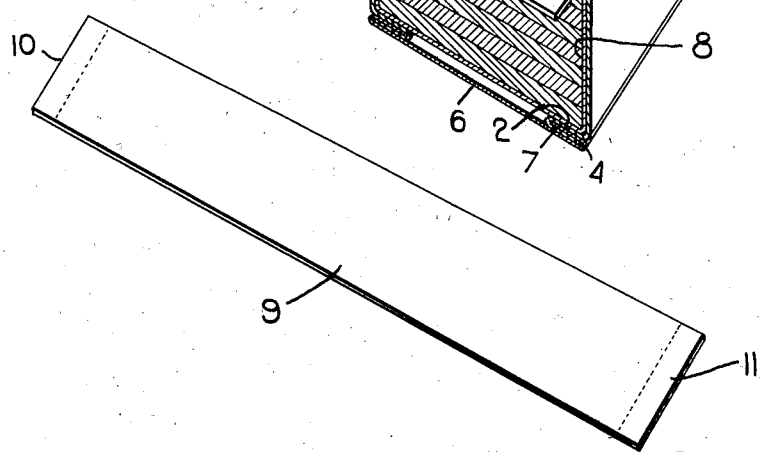
Inventor.
Frederick H. Schlesser
by Heard Smith & Tennant.
Attys.

Patented Sept. 10, 1935

2,014,265

UNITED STATES PATENT OFFICE 2,014,265

METAL SPRING COVER

Frederick H. Schlesser, Chicago, Ill., assignor to Ajax Spring Stabilizer Company, Brookline, Mass., a corporation of Illinois Application January 3, 1933, Serial No. 649,751

3 Claims. (Cl. 267—37)

This invention relates to improvements in metal spring covers for vehicle springs, such as the semi-elliptical springs of automobiles, and the object of the invention is to provide a sectional spring cover construction, the sections of which may be assembled to fit any type of commercial vehicle spring. The laminated or leaf springs, which are used on various types of vehicles, are of different widths, of different thickness, some being provided with a greater number of laminations than others, and of different lengths.

One of the objects of the invention is to provide a sectional metal spring cover construction in which side members of the spring cover may be made of such different widths that by selecting the side members of the required width they may be assembled with suitable upper sections to cover springs of different thickness, and further to provide upper and lower members of different widths adapted to be assembled with the proper side members properly to enclose the spring.

It is difficult to apply usual spring covers to the springs of automobiles after the automobile has been assembled, and in usual practice spring covers are applied to the springs at the automobile factories having suitable mechanism for loading or straightening the springs in order to enable the cover to be applied more easily.

A further object of the invention is to provide a metal spring cover which can be readily applied to the springs of an assembled automobile.

Another object of the invention is to provide a metal spring cover construction which can be applied to the springs by unskilled labor and which, after such application, will present a pleasing appearance.

These and other objects and features of the invention will more fully appear from the following description and the accompanying drawing, and will be particularly pointed out in the claims.

In the drawing:

Fig. 1 is a side elevation of one-half of a semi-elliptical spring provided with a cover embodying the invention;

Fig. 2 is an enlarged vertical cross sectional view on line 2—2 Fig. 1;

Fig. 3 is an enlarged detail view in perspective illustrating the manner in which the bottom member of the spring cover is assembled upon the side members; and, Fig. 4 is a perspective view of a plate which preferably is introduced between the lower face of the spring and the lower section of the spring cover.

The preferred form of spring cover illustrated in the accompanying drawing comprises side members 1 which may be made of different widths, to correspond to sections of the spring of different thickness. The side members 1 are of sheet metal and are tapered to conform to the sections of the spring to which they are to be applied, and desirably the larger end of each side member overlaps the smaller end of the adjacent tapered member. The upper and lower members of the spring cover likewise are of sheet metal and of the width of the spring, and suitable means are provided to cause interengagement of the edge portions of adjacent members when they are applied to the spring to enable the cover to be firmly locked upon the spring.

In the preferred construction as illustrated in Figs. 2 and 3, the side members 1 are provided with longitudinally extending edge flanges 2 which are reversely bent into narrow U-shape to provide a narrow slot 3 therebetween. The flanges 2 are preferably bent at substantially right angles to the plane of the side members 1 and fit closely over the upper and lower edge portions of the spring, the edge of the reversely bent flange 4 lying within the vertical plane of the side member 2 when applied to the spring. The lower spring cover member 5, and preferably also the upper spring cover member 6, is of a width corresponding to the full width of the spring, and is provided with inwardly bent flanges 7 adapted slidably to engage the slot 3 in the reversely bent flanges of the side section.

In assembling the spring cover upon the spring the spring desirably is first wrapped with a lubricating-containing wrapper of fibrous material, such as a grease-soaked canvas 8. A plate 9 is then placed against the overlapping layers of canvas along the lower face of the spring. A plurality of side sections 1 are then placed upon the spring with the flanges 2 overlying the upper face of the spring, and also overlying the plate 9 which is held against the under face of the spring. The reversely bent flanges of adjacent side members are telescoped sufficiently to cause the side members to overlap such distance as to prevent exposure of the edges of the spring during the flexing thereof. The flanges 7 of the upper and lower members are then engaged with the grooves 3 of the reversely bent flanges 2—4, and slipped lengthwise of the side members, thereby assembling them together. Preferably the upper and lower members 5 and 6 extend the full length of the portion of the spring to be covered and when assembled upon the spring the ends 10 and 11 of the sheet metal plate are bent over the ends of the lower member and serve to prevent any longitudinal shifting of the latter upon the spring.

If the spring is in such position that the upper and lower members of the spring cover cannot be readily slid into the grooves 3 of the flanges of the side sections, the flanges may be separated by a suitable tool sufficient to permit them to be interengaged and thereafter hammered down. After the spring cover has been assembled upon the spring, the edge portions of the upper and lower members may be lightly hammered to cause the flanged portions of the respective members to interengage more closely, but such hammering of the spring cover should not be sufficient to prevent sliding movement between the side sections of the spring cover in response to the flexure of the spring.

By reason of this construction spring covers may be constructed upon usual types of sheet metal folding machines. The side sections may be cut for different thicknesses of springs and may be utilized in connection with the same width of upper and lower covers for different springs varying only in the thickness of the spring, but not the width. Similarly, the upper and lower sections may be of a width suitable for any desired width of spring and may be assembled with any pairs of side sections corresponding to the thickness of the spring.

As a result of the present invention, therefore, spring covers can be readily constructed to conform to any spring without the necessity of providing separate complete units of different sizes for different types of springs, and can be easily assembled upon the springs of assembled automobiles.

It will be understood that the particular embodiment of the invention disclosed herein is of an illustrative character and is not restrictive, and that various changes in form, construction and arrangement of parts may be made within the meaning and scope of the following claims.

Having thus described the invention, what is claimed as new, and desired to be secured by Letters Patent, is:

1. A spring cover construction having side members each comprising a plurality of tapered sections of thin sheet metal having widths corresponding substantially to the thickness of the section of the spring to which they are applied, with the adjacent edges of successive sections in overlapping relation, upper and lower members of thin flexible sheet metal corresponding in width substantially to the width of the spring and extending along said side members, and means for slidably interengaging the edge portions of said upper and lower members respectively with complementary edge portions of each of said side members.

2. A spring cover construction having side members each comprising a plurality of tapered sections of thin sheet metal having widths corresponding substantially to the thickness of the section of the spring to which they are applied, and provided with reversely folded edge flanges to extend over and fit upon the upper and lower edge portions of the spring, and upper and lower members of thin flexible sheet metal corresponding to the full width of the spring and extending along all of said side sections and having infolded edge flanges adapted slidably to engage respectively the complementary edge flanges of all of said side sections, thereby enabling the spring cover to be readily assembled upon the spring and to permit relative movement between both the upper and lower members and said side sections upon flexure of the spring.

3. A spring cover comprising a wrapping of lubricant-containing fibrous material enclosing the spring, a thin flexible sheet metal plate extending longitudinally of the lower face of the spring and engaging said wrapping, a plurality of tapered sections of thin sheet metal having a width substantially corresponding to the thickness of the wrapped spring having their adjacent ends overlapped and provided with longitudinally extending reversely flanged edge portions to extend over and fit upon the upper edge portions of the wrapped spring and under the edge portion of said plate respectively, and upper and lower members of thin sheet metal corresponding substantially to the full length and width of the wrapped spring and having infolded edge flanges adapted to be slidably engaged respectively with the complementary flanges of the side members, thereby enabling the spring cover to be readily assembled upon the spring and to permit relative movement between both the upper and lower members and said side sections upon flexure of the spring, the ends of said plate being bent over the respective ends of the lower cover member.

FREDERICK H. SCHLESSER.